Figure 2:
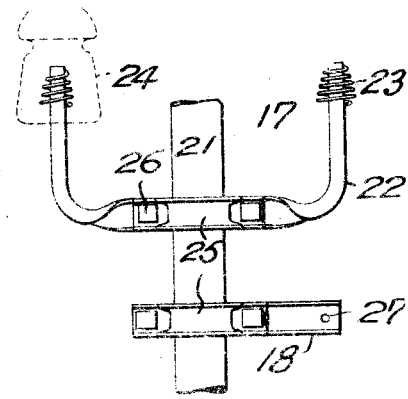

F. M. SIMPSON.
APPARATUS FOR DISTRIBUTING ELECTRIC CURRENT.
APPLICATION FILED FEB. 11, 1915.

1,199,212.

Patented Sept. 26, 1916.

Witnesses

Inventor
F. M. Simpson
By
Attorneys

UNITED STATES PATENT OFFICE.

FRANK M. SIMPSON, OF MONTREAL, QUEBEC, CANADA.

APPARATUS FOR DISTRIBUTING ELECTRIC CURRENT.

1,199,212. Specification of Letters Patent. Patented Sept. 26, 1916.

Application filed February 11, 1915. Serial No. 7,553.

*To all whom it may concern:*

Be it known that I, FRANK M. SIMPSON, a citizen of the Dominion of Canada, and resident of the city of Montreal, in the Province of Quebec and Dominion of Canada, have invented certain new and useful Improvements in Apparatus for Distributing Electric Current, of which the following is a full, clear, and exact description.

This invention relates to a method or and apparatus for distributing electric current, such as that supplied to residences and other buildings for lighting and telephone service, and the object is to provide means for distributing the current and supporting the current carrying wires in such a manner that pole lines on streets or lanes may be completely or entirely eliminated.

A further object is to provide a wire supporting means applicable to the materials already existing in the buildings, so that the cost of material and time may be reduced to a minimum.

The invention consists essentially in providing cross arms or suitable brackets which may be attached to the upwardly projecting portions of soil pipes, which project through the roofs of practically all buildings to form ventilators for the plumbing in the building. These pipes project from two to four feet above the roofs, are usually about 4½ inches in diameter, and amply strong to support all the stress that will be placed on them by short spans of wire of light cables. Furthermore, these pipes are metal and continue into the earth, so that they form excellent conductors should the wires become accidentally grounded thereon, and are amply large to carry all the current which might be passed through them, without any danger to the building or occupants thereof.

In all thickly settled and progressive communities, it has become the custom to construct underground conduits on main routes, in order to remove unsightly and dangerous wires and cables, belonging to electric light, and telephone and telegraph companies. The primary lighting circuit is placed in the conduits, and is stepped down through transformers located in wells at suitable intervals to the voltage required for lighting. The secondary circuit wires are brought above ground for each block or group of houses, or possibly a single building, and in a great many instances, it is found necessary to establish pole lines to carry the secondary wires, thus largely defeating the object of the conduits. Attempts have been made to carry the wires along the rear walls of houses or along back fences, but this method can be employed only in districts where the houses are uniform, and is moreover a very expensive proposition, as the wires require to be inclosed in metal conduits. Sometimes, the wires are carried from house to house over the roofs, but this necessitates the establishment of supports, to which proprietors often strenuously object, as the swinging of the wires with the wind soon loosens the support anchorages, and causes leaking of the roof. The telephone companies are in practically the same position.

According to this invention, the ventilating stacks of the buildings are used as poles, and special cross arms provided which clamp on to the stacks without the necessity of drilling or cutting the stacks in any way. Thus, in a district served by underground conduit, the secondary wires and telephone distribution cables may be brought up the back wall of a house at the end of a block, and the wires and cable run along from house to house supported on brackets attached to the ventilating stacks.

Figure 3:
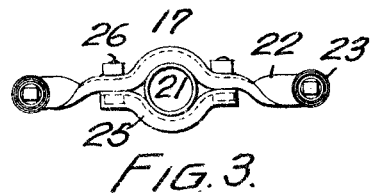
Figure 1:
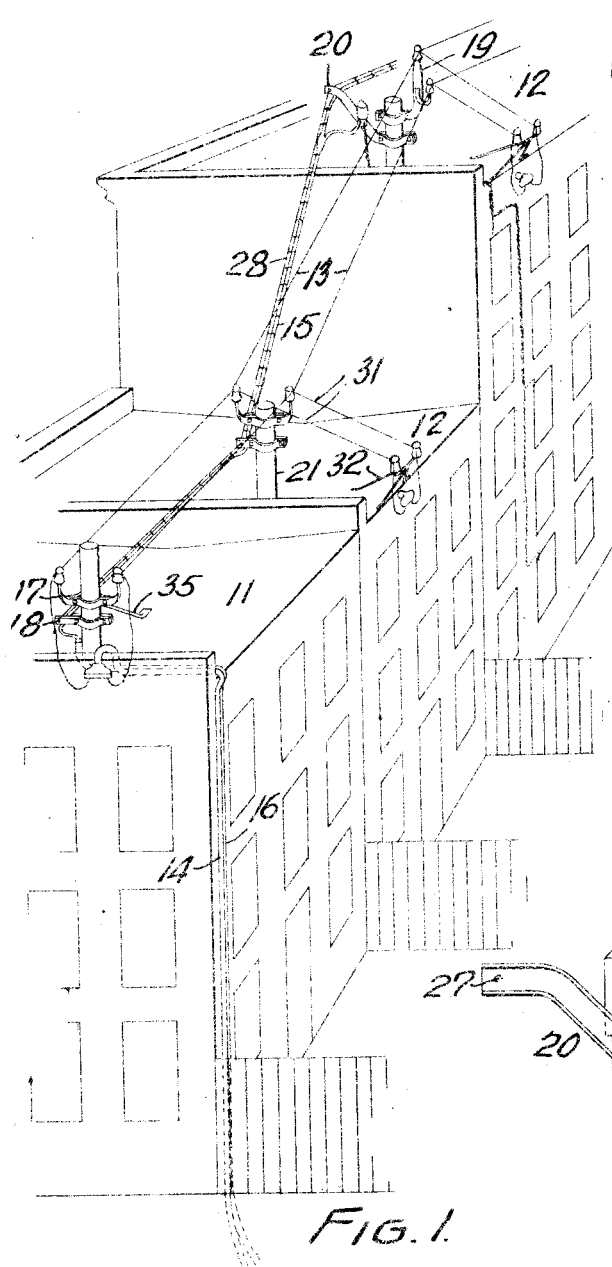
Figure 4:
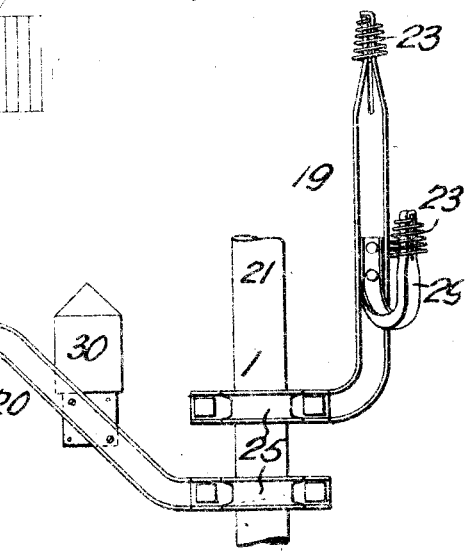

In the drawings which illustrate the invention:—Figure 1 is a perspective view showing the arrangement of wires and cables over a row of buildings. Fig. 2 is an elevation of one form of cross arm. Fig. 3 is a plan view of same. Fig. 4 is an elevation of a slightly different form of cross arm.

Referring more particularly to the drawings, 11 designates a building at the end of a block, and 12 the succeeding buildings in the block. The secondary light circuit wires 13 come up from the underground transformer through a conduit 14, and the telephone cable 15 comes up in the same manner from under ground through a conduit 16. Brackets of different forms, designated 17, 18, 19 and 20 are attached as required to the portions 21 of the ventilating stacks projecting above the roofs. The different types of these brackets are mounted as required, the arms 17 and 18 being used where merely transmission is to be considered, and the forms 19 and 20 where there is combined transmission and distribution. The brackets 17 may also be used where there is distribution, as indicated in Fig. 1.

The brackets 17 and 19 are used for wire supports and the arms 18 and 20 for cable supports. The arm 17 consists of a member 22 preferably of channel section bent to embrace one half of the stack, as clearly shown in Fig. 3, and turned upwardly at the ends and provided with any suitable means such as the spiral spring 23, rigidly mounted for engagement with the internal threads of the usual glass or porcelain insulators 24. The bracket is secured to the stack by means of a clamping member 25 preferably of channel section, and curved to embrace the other half of the stack's circumference. In using metal of channel section, it is advisable to have the web engage the stack in the case of the clamping member, and the flanges engage the stack in the case of the bracket itself, so that the flanges of the clamping member will engage the heads of the clamping bolts 26 and hold the same against turning, while the nuts may be freely turned over the outer surface of the bracket web. All the brackets are securable to the stack in the same manner as just described. The cross arm 18 is quite short, and projects laterally, and is provided near its extremity with an aperture 27 for the passage of a cable supporting wire 28. The cross arm 19 is turned upwardly, as clearly shown, and has a bracket 29 secured thereto some distance below the upper extremity of the arm. The upper extremities of the arm and bracket are provided with suitable means 23 for the attachment of insulators. This form of bracket is preferably used with the large offset arm for cable suspension. This latter arm is provided at its free extremity with an aperture 27 for the cable supporting wire, and carries intermediate its ends a terminal or connection box 30. The wires for the consumer separate from the cable and run down between the flanges of the cross arm from the box 30, from whence they extend along any suitable path into the building. The consumer's supply wires 31 lead from the secondary wires 13 to the existing tripod support 32 or any suitable equivalent and thence to the inlet condulet of the building wire system.

It will be readily seen that the arms 19 and 20 maintain the telephone wires and light wires on opposite sides of the stack, and therefore out of all possibility of contact. When, however, a lead covered cable is used, it will be sufficient where there is no terminal to use the small cross arms 18 suspending the cable below the light wires.

From the foregoing description, it will be readily seen that a novel, convenient, inexpensive and safe method of carrying light and telephone distribution wires is provided, which will not be unsightly. The ventilating stacks and the tripods 32 are already in existence on practically every building, the brackets are inexpensive, and may be quickly and easily attached, and do not injure the ventilating stacks. Thus, the cost is much less than establishing pole lines, conduits or cables on the walls of buildings, the arrangement is not unsightly, and is, if possible, more safe than anything at present in use, as each cross arm is attached to a perfect ground. At the ends of blocks, the ventilating stacks may be braced to resist the tension of the wires and cables by struts 35, which may be attached to the cross arms directly.

Having thus described my invention, what I claim is:—

A bracket comprising a pair of members of channel section formed to clamp together around a pole, pipe or the like, one of said members having the web thereof adjacent the pole to which it is clamped, and the other member having the web thereof spaced away from the pole by its flanges, bolts clamping said members together having the heads thereof inserted between the flanges of said first mentioned member and held against revolution thereby.

In witness whereof, I have hereunto set my hand, in the presence of two witnesses.

FRANK M. SIMPSON.

Witnesses:
R. W. ALLEN,
G. M. MORELAND.